(12) United States Patent
Voinea et al.

(10) Patent No.: US 11,797,705 B1
(45) Date of Patent: Oct. 24, 2023

(54) GENERATIVE ADVERSARIAL NETWORK FOR NAMED ENTITY RECOGNITION

(71) Applicant: Amazon Technologies, Inc., Seattle, WA (US)

(72) Inventors: Daniel Voinea, Iasi (RO); Aurelian Tutuianu, Iasi (RO); Silviu Catalin Poede, Iasi (RO); Marian-Razvan Udrea, Iasi (RO); Brent Gregory, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 580 days.

(21) Appl. No.: 16/711,260

(22) Filed: Dec. 11, 2019

(51) Int. Cl.
| | |
|---|---|
| *G06F 21/62* | (2013.01) |
| *G06F 40/295* | (2020.01) |
| *G06F 18/24* | (2023.01) |
| *G06N 3/045* | (2023.01) |

(52) U.S. Cl.
CPC ............ *G06F 21/6245* (2013.01); *G06F 18/24* (2023.01); *G06F 40/295* (2020.01); *G06N 3/045* (2023.01)

(58) Field of Classification Search
CPC ... G06F 21/6245; G06F 40/295; G06K 9/6267; G06N 3/0454
See application file for complete search history.

(56) References Cited

U.S. PATENT DOCUMENTS

| | | | |
|---|---|---|---|
| 9,132,957 | B1 | 9/2015 | Girdhar et al. |
| 10,878,124 | B1 | 12/2020 | Sitaraman et al. |

(Continued)

OTHER PUBLICATIONS

A. Graves, A. Mohamed, and G.Hinton., "Speech Recognition with Deep Re-current Neural Networks," 2013 IEEE International Conference on Acoustics, Speech and Signal Processing, arXiv preprint: arXiv:1303.5778 [cs.NE], pages 1-5, 2013.
Chiu et al., "Named Entity Recognition with Bidirectional LSTM-CNNs," Transactions of the Association for Computational Linguistics (2016) 4: 357-370.
Daniel Voinea, et al., "Large scale detection of data stores containing personal information," preprint Oct. 29, 2019, pages 1-8.
Daniel Voinea, et al., "Personal Data Classifier: High Level Overview," preprint Oct. 29, 2019, pages 1-7.

(Continued)

*Primary Examiner* — Francis Geroleo
(74) *Attorney, Agent, or Firm* — Robert C. Kowert; Kowert, Hood, Munyon, Rankin & Goetzel, P.C.

(57) ABSTRACT

A generative adversarial network (GAN) may be implemented to recognize named entity types in detection of sensitive information in datasets. The GAN may include a generator and a discriminator. The generator may be trained to produce synthetic data to include information that simulates named entity types representing the sensitive information. The discriminator may be fed with real data that are known to include the sensitive information (as positive examples), together with the synthetic data that simulate the sensitive information (as negative examples), to train to classify the real vs. synthetic data. In field operations, the discriminator may be deployed to perform named entity type recognition to identify data having the sensitive information. The generator may be deployed to provide anonymous data in lieu of real data to facilitate sensitive information sharing and disclosure.

20 Claims, 11 Drawing Sheets

(56) References Cited

U.S. PATENT DOCUMENTS

| | | | | |
|---|---|---|---|---|
| 11,188,827 | B1* | 11/2021 | Mugan | G06N 20/00 |
| 2017/0372094 | A1 | 12/2017 | Hore | |
| 2019/0171908 | A1 | 6/2019 | Salavon | |
| 2020/0104357 | A1* | 4/2020 | Bellegarda et al. | G06N 3/088 |
| 2021/0117567 | A1* | 4/2021 | Braghin et al. | G06F 21/6245 |
| 2022/0076066 | A1* | 3/2022 | Forgeat et al. | G06K 9/6263 |
| 2022/0083872 | A1* | 3/2022 | Mugan | G06N 3/084 |

OTHER PUBLICATIONS

Goodfellow, I.; Bengio, Y.; and Courville, A. 2016 "Deep learning," The MIT Press 2016, ISBN: 0262035618, pages 305-307, published online Oct. 29, 2017 Springer.

Hochreiter, S. and Schmidhuber, J., "Long short-term memory," - Neural computation 9(8): pages 1-32, 1997.

Hoffart et al., "Robust Disambiguation of Named Entities in Text," Proceedings of the 2011 Conference on Empirical Methods in Natural Language Processing, pages 782-792, Edinburgh, Scotland, UK, Jul. 27-31, 2011 Association for Computational Linguistics.

Huang et al., "Bidirectional LSTM-CRF Models for Sequence Tagging," arXiv preprint: arXiv:1508.01991 [cs.CL], pages 1-10, 2015.

Jason P.C. Chiu and Eric Nichols "Named Entity Recognition with Bidirectional LSTM-CNNs," Transactions of the Association for Computational Linguistics, vol. 4, pp. 357-370, 2016.

Jonathan Raiman and Olivier Raiman, "DeepType: Multilingual Entity Linking by Neural Type System Evolution," Vol. 32 No. 1: Thirty-Second AAAI Conference on Artificial Intelligence / Main Track: NLP and Machine Learning, pages 1-8, 2018.

Lai et al., "Recurrent Convolutional Neural Networks for Text Classification," AAAI Publications, Twenty-Ninth AAAI Conference on Artificial Intelligence, Jan. 2015, Pages 2267-2273.

Lantao Yu, Weinan Zhang, Jun Wang, Yong Yu, "SeqGAN: Sequence Generative Adversarial Nets with Policy Gradient," Proceedings of the Thirty-First AAAI Conference on Artificial Intelligence (AAAI-17), pages 2852-2858, 2017.

Octavian-Eugen Ganea and Thomas Hofmann, "Deep Joint Entity Disambiguation with Local Neural Attention," arXiv preprint: arXiv:1704.04920 [cs.CL], pages 1-12, 2017.

Radhakrishnan et al., "ELDEN: Improved Entity Linking using Densified Knowledge Graphs," Proceedings of the 2018 Conference of the North American Chapter of the Association for Computational Linguistics: Human Language Technologies, Volume 1, pages 1-10, 2018.

Rupesh et al., "Highway networks," arXiv preprint: arXiv:1505.00387 [cs.LG], pages 1-6, 2015.

Sil et al., "Neural Cross-Lingual Entity Linking," The Thirty-Second AAAI Conference on Artificial Intelligence (AAAI-18) pages 5464-5472, 2018.

U.S. Appl. No. 16/711,255, filed Dec. 11, 2019, Daniel Voinea, et al.

Amazon, "AWS Macie," Amazon Web Services, https://aws.amazon.com/macie/ via the wayback machine Dec. 9, 2019, pages 1-9.

* cited by examiner

GENERATIVE ADVERSARIAL NETWORK FOR NAMED ENTITY RECOGNITION

BACKGROUND

Sensitive information is data that requires guard from unauthorized access and unwarranted disclosure in order to maintain the information security of an individual or organization. Sensitive information may include personal information, corporations business information or governmental classified information. Protecting sensitive information is becoming increasingly important. For instance, the collection and use of Personally Identifiable Information (PII) (which is one example of sensitive information for purposes of illustration) have been under ever-increasing public scrutiny driven by concerns to protect customers' privacy interests. Broadly speaking, PII data may include any data that could potentially identify a specific individual. For instance, PII data may include a person's name, passport number, driver's license number, social security number, telephone number, customer ID, websites, medical record, biomedical information, and so on. Governments around the world have been enacting stringent data protection laws, such as the European Union's General Data Protection Regulation (GDPR) and California Consumer Privacy Act (CCPA). To comply with relevant governmental regulations, it is thus important for companies that process, store, maintain, and manage data sets to have capabilities of examining and identifying data stores which contain sensitive data.

Identification of sensitive information, for instance, PII data, may be implemented based on named entity recognition (NER). For example, to perform PII data identification, individual PII data may be represented by a respective entity type. For example, human beings' names may be designated as a first entity type, social security numbers may be represented by a second entity type, and so on. This way, identifying data stores which contain sensitive data (hereinafter "sensitive data stores") is translated to detecting data stores which comprise the named entity types. Existing NER techniques generally base on discovering regular expressions (hereinafter "regexes") or analyzing annotated data. A regex is a sequence of one or more characters that define a search pattern. For example, a string of numbers in the range of [000,000,000 - 999,999,999] may be a regex for finding a social security number. Annotated data are texts stored in a separate "annotation file" which annotate (or mark) entity types and/or their positions in the corresponding item, for example, a table in an Amazon DynamoDB, a JSON or XML file in an Amazon S3 bucket, etc. Google Data Loss Prevention (DLP) is one example based on annotated data to perform sensitive data scanning. However, neither of the above approaches is capable of large-scale detection of PII data stores. One, it is hard to deploy the approaches at scale. For example, it may require a large, if not impractical, amount of annotated data to automate scrutiny of large-scale data stores, e.g., those containing gigabytes, terabytes or even exabytes of data. Two, those approaches are vulnerable to issues such as syntactic ambiguities (e.g., a 9-digit number, defined as a regex, may be either a social security number or just a task ID), context proximity semantic (e.g., an IP address, defined as a content detector, may or may not be considered personal data depending on whether it is associated with a person's name in proximity), and nature of the texts (e.g., natural language versus computed-aid generated texts). Thus, it is desirable to have a tool for implementing automated large-scale detection of sensitive data stores with improved accuracy and efficiency, but without reliance on regexes and/or annotated data.

Figure 1:
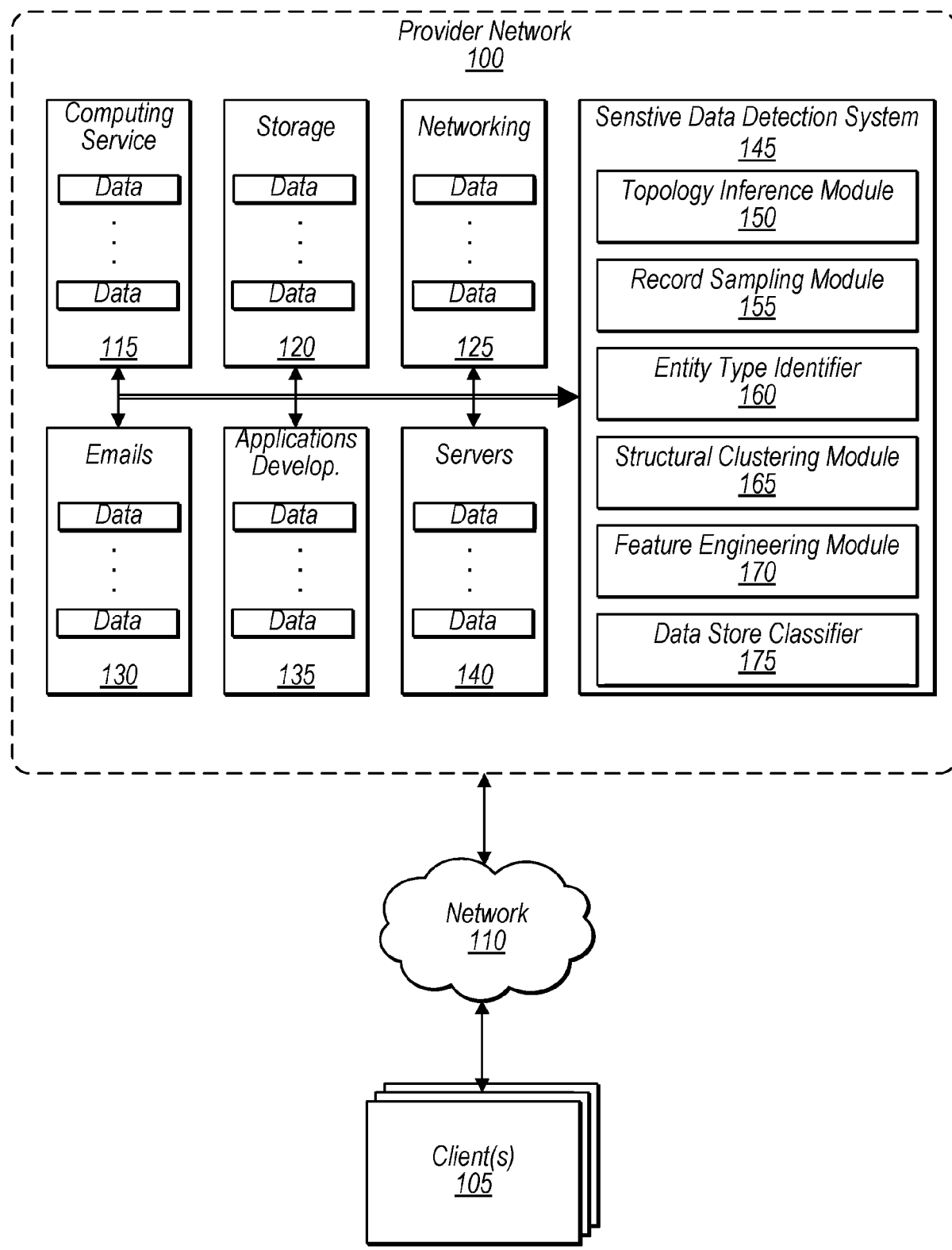
FIG. 1 is a block diagram showing an example sensitive data detection system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

In various embodiments, systems and methods for detecting data stores containing sensitive information may be implemented. A sensitive information detection system may comprise a topology inference module, an optional record sampling module, an entity type identifier, an optional structural clustering module, a feature engineering module, and a data store classifier. The topology inference module may access one or more data stores and, for individual data store, infer a topology of a respective data store based on metadata associated with items stored in the data store. The inferred topology may provide information as to distributions of the items in the respective data store. The topology inference module may also create one or more record set(s) based on external form similarities of the items of the data store. The optional record sampling module may, for individual data store, sample records from the items of the respective data store based on the inferred topology of the respective data store. The optional record samples may be representative of the whole population of the respective data store. For individual data store, the entity type identifier may analyze the record samples to determine whether the respective data store contains data which matches named entity types, wherein the named entity types represent sensitive information such as PII data. The optional structural clustering module may further partition individual record set into one or more record clusters based on structural similarities of the record samples in the record set. The structural similarities may represent an extent of content similarities of the record samples. Thus, the record clusters may have records of more homogenous structures than those in the corresponding record set. The feature engineering module may extract information obtained by the above modules, for instance, the metadata, identification of the named entity types, record cluster(s), and so on, to create one or more features. The data store classifier may then take the extracted features as input to detect whether the data store contains sensitive data. For instance, the data store classifier may render a confidence score to indicate a probability for the data store to contain sensitive information, such as PII data. For purposes of illustration, this disclosure will be focused on PII data detection. The systems, methods and techniques disclosed herein may however be applied for inspection of other types of sensitive information, such as corporations business information, governmental classified information, etc.

FIG. 1 is a block diagram showing an example sensitive data detection system, according to some embodiments. As shown in FIG. 1, provider network 100 may provide various network-based services to one or more client(s) 105 via network 110. For instance, provider network 100 may provide computing services 115, storage services 120, networking services 125, email services 130, application development services 135 and remote serve services 140. Each of the above services may involve processing, storage, maintenance and management of datasets. Sensitive data detection system 145 may access the datasets, programmatically or on-demand, and inspect those datasets to detect whether and which datasets contain sensitive information such as PII data. As used herein, "data store" and "dataset" may be used interchangeably to mean a collection of data, typically data in objects or files stored in a storage resource. FIG. 1 depicts the applications of sensitive data detection system 145 in provider network 100 as one example. Sensitive data detection system 145 may be applied to detect sensitive data stored on local storage devices, enterprise local access networks (LANs), or a hybrid network including LAN and cloud computing resources, and the like. Moreover, in the context of large-scale data processing, storage, maintenance and management, it is more often to employ structured data formats in order to achieve organized data storage and fast search and retrieval. Example items having structured data may include tables in an Amazon DynamoDB, and JSON documents or XML files in an Amazon S3 bucket. Referring to FIG. 1, sensitive data detection system 145 may include topology inference module 150, optional record sampling module 155, entity type identifier 160, optional structural clustering module 165, feature engineering module 170, and data store classifier 175. Sensitive data detection system 145 may access the data stores and collect information, such as locations of items stored in respective data stores and metadata associated with the items. Metadata may comprise information describing data in each item. The metadata may comprise, for instance, a means of creation of data, a purpose of the data, a time and date of creation, a creator or author of data, placement on a computer network associated with where the data was created, standards used, basic information (e.g., a digital image may include metadata describing how large the digital image is, a color or depth of the digital image, a resolution of the digital image, a creation time, etc.) Different from annotated data described above, metadata are not stored in a separate file. Rather, they may be generated together with data and become an integrated part of the data. In some embodiments, once created, metadata may be immutable. For instance, Amazon S3 bucket may create system-defined metadata for each object stored in the bucket, including object creation date, object size, last modification date, storage class, usage of encryption and permissions, etc. Further, when uploading data, a client may also assign user-created metadata to an object to aid data search and retrieval. The user-defined metadata may include, for example, column name, content type, and so on.

Based on the metadata associated with the items of the data store, topology inference module 150 may infer a topology of the data store. The topology inference may provide information as to distributions of items and their contained records in the data store. For instance, for a given S3 bucket, topology inference module 150 may analyze the bucket's prefix tree architecture (i.e., the directory of the data store) to identify how many prefixes (i.e., folders) may be stored in the data store and how many items each prefix may contain. The distribution information may represent a density of the population of the data store, which may facilitate sampling of records by optional sample recording module 155. Based on metadata, topology inference module 150 may further approximate items types and create one or more record sets. As used herein, the word "record" may refer to data of an item (e.g., an object or file) in a data store. For instance, a row of an Amazon DynamoDB table or a log event from an Amazon S3 log file may be viewed as one record. A record set may be a collection of items having a similar external form. For instance, tables in Amazon DynamoDB, Redshift or Athena may be grouped into one record set. Alternatively, log files of a service written to an S3 bucket may be another record set.

According to some embodiments, optional record sampling module 155 of sensitive data detection system 145 may sample records from the items of a data store. For a given data store, it may be ideal to inspect entire data of the data store. This is possible for small size data stores. However, for large-scale data stores having gigabytes, terabytes, or even exabytes of data, full population inspection may be challenging if not impossible. Thus, to improve efficiencies, optional record sampling module 155 may perform the record sampling based on the inferred topology of the data store. For instance, a S3 bucket may have three prefixes, wherein S3://a prefix stores 50% of the S3 bucket's objects, S3://b/c prefix contains 40% objects, and S3://b/d prefix includes 10% objects. Record sampling module 310 may thus be configured to sample records randomly from //a, //b/c and //b/d prefixes in an approximate proportion with the distribution of items in those three prefixes. This way, the record samples may be representative for the whole population of this bucket.

According to some embodiments, entity type identifier 160 may be configured to identify that a datastore contains data matching one or more named entity types. As described above, each named entity type may represent one type of sensitive information. For instance, a first named entity type may represent clients' names, while a second named entity type (with the first named entity type in proximity) may correspond to names of diseases (with clients' names in proximity) - meaning disease information may belong to PII data if it is attributed to a person. This way, detecting the sensitive information may now translate to named entity recognition. Entity type identifier 160 may analyze the record samples and/or associated metadata to determine whether a given data store contains data that fit a named entity type. For instance, entity type identifier 160 may inspect the record samples to recognize whether the record samples include data that appear like a person's name. Alternatively, entity type identifier 160 may examine whether the record samples contain data that match the name of a disease with adjacent data, e.g., data in the same record sample or the same object or file, which seem like a person's name. According to some embodiments, entity type identifier 160 may be implemented using pattern-based approaches. The pattern-based approaches may employ dictionary-based solutions, implemented with indexes, prefix tress, or other data structures, capable of storing and retrieving textual patterns. One example pattern-based approach may use regex pattern matches with optional validation filters to identify named entities. Alternatively, according to some embodiments, entity type identifier 160 may be implemented based on machine learning algorithms, for instance, sequence-to-sequence (seq2seq) language processing networks, to perform named entity type identification.

According to some embodiments, sensitive data detection system 145 may include optional structural clustering module 165, as shown in FIG. 1. The purpose of structural clustering module 165 may cluster one or more record samples into record cluster(s). As described above, topology inference module 150 may create record set(s), based on metadata, each having a collection of records with a homogenous external form. The external form similarity may be obtained based on metadata and indicate that items in one record set may belong to same or similar types. Structural clustering module 165 may investigate the record samples in a record set, based on the record samples' structural similarity, and further partition the record set into record cluster(s). The structural similarity may represent an extent of records' content similarity, for example, how closely the records contain same or similar contents. Thus, rather than relying merely on metadata, structural clustering module 165 may use structures of the record samples to create the record cluster(s). The record cluster(s) may include record samples which may be more homogenous than those in original record set(s). For instance, a record set may include three DynamoDB records - table A, B and C. Table A may include fields such as (ID name, phone, age), table B may contain fields such as (ID, name, phone), and table C may have fields such as (company-name, symbol). Structural clustering module 165 may group tables A and B into a first record cluster because they have more similar structures and table C into a second record cluster.

According to some embodiments, feature engineering module 170 of sensitive data detection system 145 may perform feature transformation on information provided by topology inference module 150, record sampling module 155, entity type identifier 160, and optional structural clustering module 165 to extract one or more features which may then be used as input to data store classifier 175. For instance, feature engineering module 170 may create a small number of features from a large number to reduce dimensions of the input. Further, feature engineering module 170 may create a new feature to emphasize characteristics of the input to improve training performance. Moreover, feature engineering module 170 may transform the input into a uniform format to ease feature manipulation and calculations. Examples of extracted features may include, for instance, a percentage of records from a record set or cluster which have a given entity type, a mean number of labels of a given type from a given field of records in a record set or cluster, approximation of heat maps used to statistically test if a given sample comes from a given distribution characterizing a named entity, etc. The extracted features, based on entity type identification as well as metadata, may comprise information representing existence of an entity type but also "context" linked with the entity type, but without reliance on annotated data or regexes. This can mitigate ambiguities and improve precisions of sensitive data detection.

According to some embodiments, data store classifier 175 of sensitive data detection system 145 may classify the inspected data based on the extracted features. Unlike those existing approaches which primarily focus on identifying named entities, data store classifier 175 aims at providing a detection of whether the data store contains sensitive data. For instance, data store classifier 175 may render output, e.g., a decision about sensitive data store detection assigned with a confidence score. According to some embodiments, the confidence score may be a normalized value between [0, 1] balanced at 0.5. A score greater than 0.5 may be interpreted as: we believe that the data store contains sensitive data. The higher the confidence score, with the more probability that the data store does contain sensitive data. Alternatively, a score less than the threshold 0.5 may be construed as: we do not believe that the data store contains sensitive data, but there are some chances. The lower the confidence score, the more probably that the data store does not contain sensitive data. As described above, identifying an entity in a data store does not necessarily mean that the entity is actually sensitive data because of associated ambiguities. For example, identification of 9-digit numbers does not necessarily mean that they are sensitive data, because a 9-digit number could be a social security number or just a task ID. Thus, data store classifier 175 may provide a more meaningful and precise detection. For instance, instead of saying S3://Development contains social security numbers (which could actually be just task IDs) merely due to identifying 9-digit numbers, sensitive data detection system 145 may provide that S3://Development contains sensitive data with a 98% confidence score.

Figure 2:
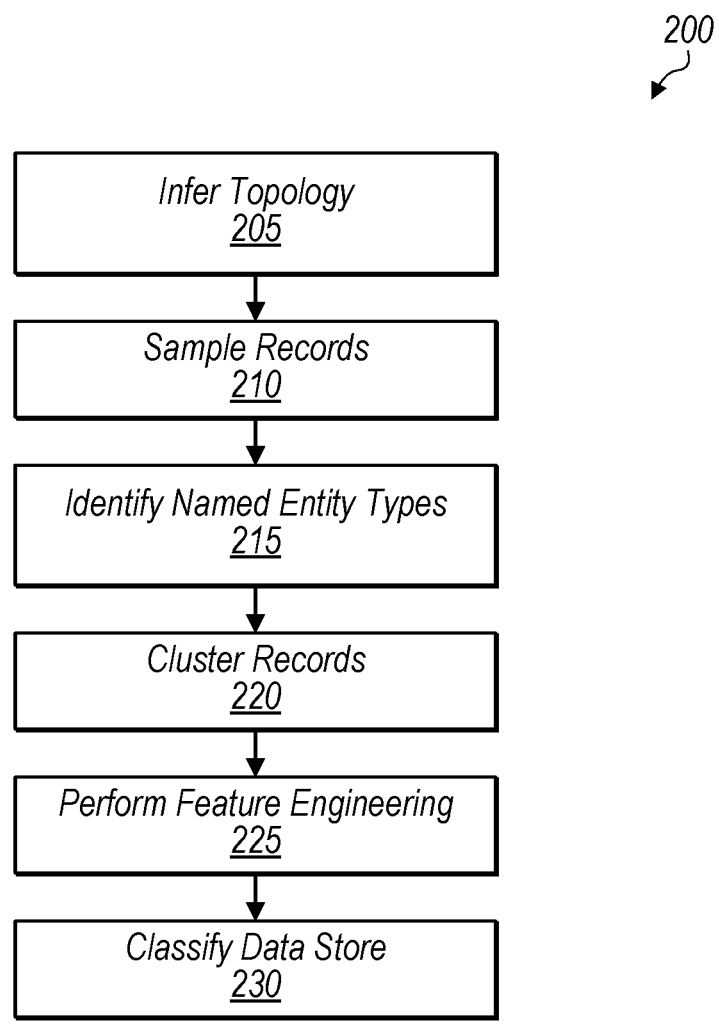
FIG. 2 is a flowchart showing an example process to perform sensitive data detection, according to some embodiments.

The above operations of sensitive data detection system 145 may be further illustrated in FIG. 2. As shown in FIG. 2, example sensitive data detection process 200 may begin with inferring topology of a data store, for instance, by topology inference module 150 as described above with regards to FIG. 1 (block 205). The topology inference may be implemented based on metadata associated with items stored in a data store. The topology inference may provide density information as to distributions of items and/or their sizes in the data store, and create one or more record sets based on external form similarities. Based on the density information, sensitive data detection process 200 may transition to sample records, for instance, by record sampling module 155 of FIG. 1 (block 210). The record samples may be representative of the population of the data store. Next, sensitive data detection process 200 may analyze the record samples to identify named entity types contained in the record samples, for instance, by entity type identifier 160 as described above in FIG. 1 (block 215). As described above, the named entity types may represent personal information such as PII data. Sensitive data detection process 200 may further optionally cluster the record samples to create record cluster(s) based on associated structural similarities, for instance, by structural clustering module 165 of FIG. 1 (block 220). The record cluster(s) may further partition a record set into more homogenous groups of record samples. Based on information obtained so far, sensitive data detection process 200 may perform feature engineering to extract features for data store classification. As described above, the feature engineering may be implemented based on identification of named entity types and metadata to create extracted features representing both named entities and associated context. Next, sensitive data detection process 200 may detect whether the data store contains sensitive data based on the extracted features, for instance, by data store classifier 175 (block 230). For instance, sensitive data detection process 200 may provide information whether the data store contains sensitive data with an assigned confidence score. Sensitive data detection process 200 may be repeated for different data stores to inspect whether individual data store includes sensitive data.

Figure 3:
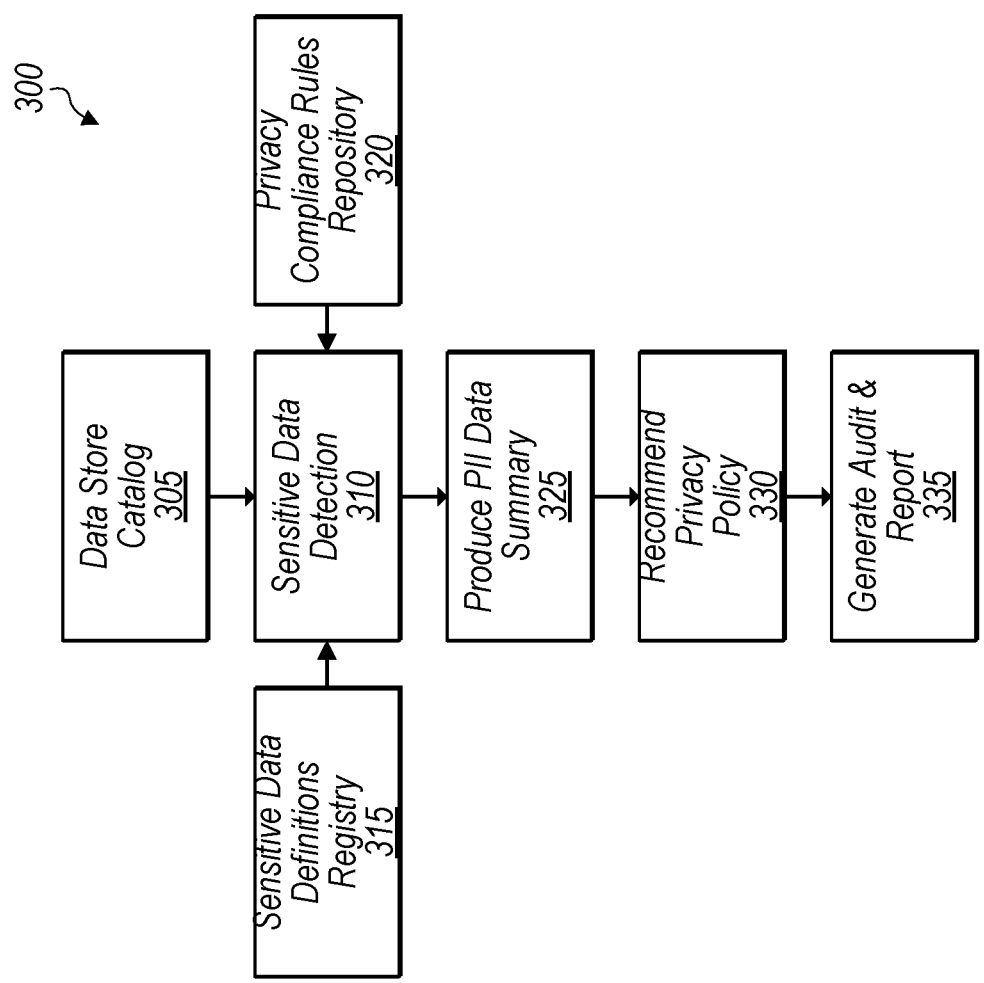
FIG. 3 is a block diagram showing an example application of sensitive data detection, according to some embodiments.

FIG. 3 shows an example application of sensitive data detection, according to some embodiments. As shown in FIG. 3, data management system 300 may include data store catalog 305 that may include one or more storage resources residing on a client's premise and/or cloud. Data store catalog 305 may be configured to process, store, maintain and manage data sets. Data store catalog 305 may maintain a data ledge, such as a directory of objects, and provide the associated storage locations and metadata to sensitive data detection system 310. Sensitive data detection system 310 may further obtain sensitive data detection rules from sensitive data definitions registry 315. Governmental regulations often provide only generic definitions of PII data. For example, GDPR provides that personal data means "any information relating to an identifiable natural person." CCPA has its own definitions on top of GDPA. One functionality of sensitive data definitions registry 315 is to "translate" the qualitative sensitive data regulations into computer friendly sensitive data detection rules. For instance, a first rule may be a first named entity type indicating people's names; a second rule may be a second named entity type (with a first named entity type in proximity), wherein the second named entity type indicates names of diseases (with a person's name in proximity) -meaning disease information may belong to PII data if it is attributed to a person. Sensitive data definitions registry 315 may continuously update the sensitive data detection rules along with evolution of governmental regulations and/or clients/companies' legal requirements. Moreover, sensitive data detection system 310 may optionally receive privacy compliance rules 320. The privacy compliance rules 320 may be provided by sensitive data definitions registry 315 or a separate privacy compliance rules repository. The privacy compliance rules may include mandatory and/or customized requirements as to sensitive data handling.

With these information, sensitive data detection system 310, which may be substantially similar to sensitive data detection system 145 as described above in FIG. 1, may access and inspect data stores to detect whether they contain sensitive data. For instance, sensitive data detection system 310 may access items in each of one or more data stores according to the storage locations. Sensitive data detection system 310 may infer a topology of the data store based on associated metadata, providing density information and/or creating record set(s). Sensitive data detection system 310 may sample records based on the density information. Sensitive data detection system 310 may optionally cluster the record samples to create record cluster(s). Sensitive data detection system 310 may identify named entity types based on the record samples. Sensitive data detection system 310 may extract feature(s) based on named entity type identification, record set(s) and/or record cluster(s) with feature engineering. Sensitive data detection system 310 may detect the data store to classify whether it contains PII data with a confidence score. In some embodiments, based on the detection, sensitive data detection system 310 may publish a sensitive data summary 325. The sensitive data summary 325 may provide information as to distributions of the sensitive data in the one or more data stores, for example, whether a data store contains sensitive data, which data store contains sensitive data store, what type of data store are contained in which data store, statistics such as a percentage of sensitive data store in a database, etc. Further, the sensitive data summary 325 may display distributions of sensitive data at customizable hierarchical and detail levels. For instance, it may provide that DynamoDB table x contains GPS coordinates and customer IDs, or DynamoDB table x contains GPS coordinates in field f1 and customer IDs in field f2. Optionally, sensitive data detection system 310 may further make recommendations of privacy policy based on the detection and privacy compliance rules 320. For instance, sensitive data detection system 310 may recommend a privacy policy as to data access, retention and usage restrictions to implement programmatical deletion of no longer needed sensitive data. Sensitive data summary 325 and optionally recommended privacy policy 330 may be provided to data store catalog 305 for creating an audit report 335.

According to some embodiments, it may be required for sensitive data detection system 310 to inspect data stores securely. To implement a secure inspection, sensitive data detection system 310 may access data stored in the data stores in isolation. Isolation controls how and when changes as to a data store of a client are made and if they become visible to another data store or client. According to some embodiments, isolated data access may be implemented by using a fleet of one or more sensitive data detection systems 310, as a central "detector", to fetch and inspect data from individual data stores, and store relevant results. Alternatively, according to some embodiments, isolated data access may be performed in a decentralized manner where data stores, owned by one client, may be examined by one respective sensitive data detection system 310. The respective sensitive data detection system 310 may be assigned customizable permissions, for launching and/or terminating computing resources, to read data from data stores of an individual client to perform sensitive data detection. This way, one sensitive data detection system 310 may be limited to access to only data stores owned by the same client. Further, operations of multiple sensitive data detection systems will not interfere with each other. For purposes of illustration, this disclose will focus on decentralized data access and sensitive data detection.

Figure 4:
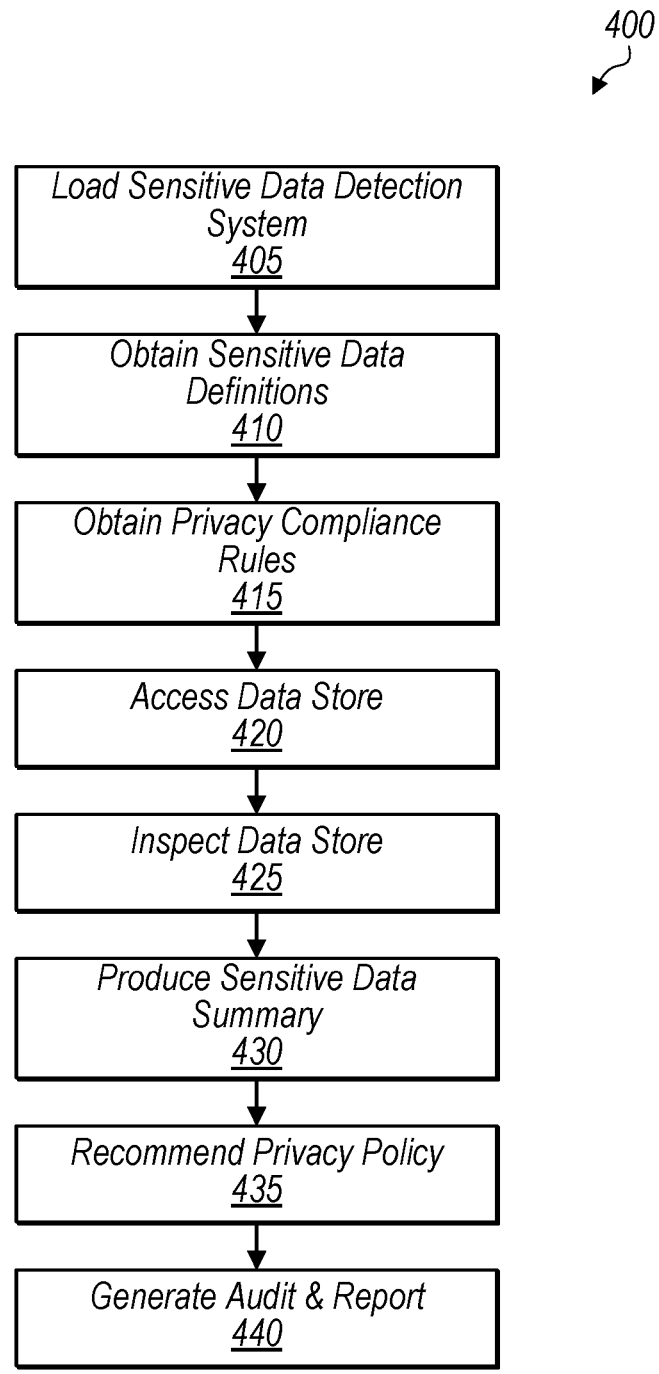
FIG. 4 is a flowchart showing an example process for performing decentralized sensitive data detection to inspect a data store, according to some embodiments.

FIG. 4 is a flowchart showing an example process for performing the decentralized sensitive data detection, according to some embodiments. In FIG. 4, sensitive data detection process 400 may first load a sensitive data detection system, for instance, from a repository (which may include one or more models of sensitive data detection systems, such as one substantially similar to sensitive data detection systems 145 and 310) to create a sensitive data detection instance (block 405). Next, PII data detection process 400 may obtain sensitive data detection rules, for instance, from sensitive data definitions registry 315 of FIG. 3 as described above with regards to FIG. 3 (block 410). Optionally, sensitive data detection process 400 may further obtain privacy compliance rules (block 415). Then, the sensitive data detection system may access a data store, for instance, with corresponding permissions as described above (block 420). The sensitive data detection system may, for example, read data and objects of the data store based on location information (e.g., provided by data store catalog 305) and associated metadata. Next, the sensitive data detection system may inspect the data store to detect whether it contains sensitive data, following the operations described above in FIGS. 1-3 (block 425). Based on the detection, the PII data detection system may publish a sensitive data summary for the inspected data store, such as sensitive data summary 325 described above in FIG. 3 (block 430). Optionally, the sensitive data detection system may produce privacy policy recommendations, for instance, based on the privacy compliance rules as described above with regards to FIG. 3 (block 435). Moreover, with the detection, the sensitive data detection system may generate a report for auditing purposes (block 440).

Figure 5A:
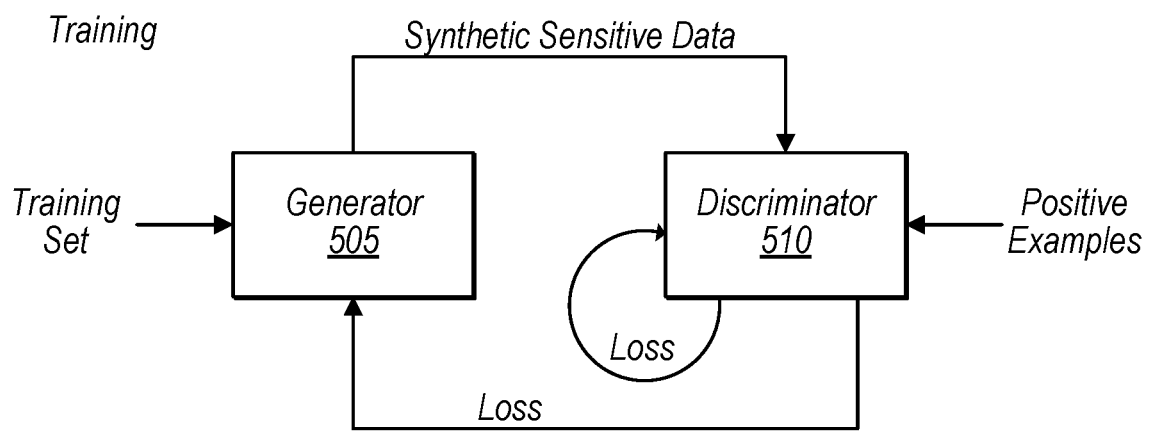
FIG. 5A is a block diagram showing training of an example generative adversarial network (GAN), according to some embodiments.
Figure 5B:
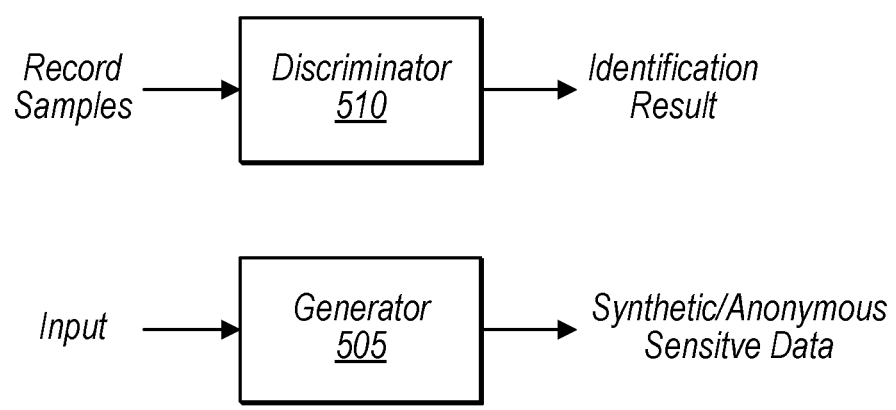
FIG. 5B is a block diagram showing deployment of an example GAN, according to some embodiments.

Entity type identification may be implemented based on machine learning algorithms, for example, Hidden Markov Models (HMM), Decision Trees, Maximum Entropy Models, Support Vector Machines (SVM), and Conditional Random Fields (CRF), etc. According to some embodiments, sensitive data detection system 145 may perform the entity type identification with a generative adversarial network (GAN). FIGS. 5A and 5B show structures and operations of an example GAN for sensitive data store detection, according to some embodiments. As shown in FIG. 5A, GAN 500 may include generator 505 and discriminator 510. When training begins, generator 505 may take a training set, for instance, "random seeds", as input. For convenience, the random seed may be created by randomly sampling real-world sensitive data. The real-world sensitive data may or may not be the same sensitive data used as positive examples in training of discriminator 510. Generator 505 may train to generate synthetic sensitive data to simulate the training set which are known to contain sensitive data. The purpose may be to use the synthetic sensitive data to "fool" (and train) discriminator 510 so that it may perform better when in use. The synthetic sensitive data may be provided to sensitive discriminator 510, serving as negative examples. As used herein, the words "negative examples" may be used to differentiate artificially generated sensitive data (by generator 505) from positive examples known to have sensitive data collected. discriminator 510 may receive synthetic data (as negative examples) and real data (as positive examples) and train to distinguish synthetic vs. real data. discriminator 510 may provide a binary label to indicate results of the classification, for instance, 1 for positive example and 0 for synthetic data. Alternatively, discriminator 510 may provide the classification according to a confidence level which indicates a probability. For instance, discriminator 510 may provide that a training set to discriminator 510 has 75% chance to be synthetic data, or 33% chance to be a positive example. Based on success or not of the distinguishment, discriminator 510 may generate losses, based on loss function(s), for discriminator 510 itself and generator 505. In training, discriminator 510 may work in a supervised mode. For instance, when discriminator 510 takes synthetic sensitive data (from generator 505) as input but mistakenly classifies them as real data, or when discriminator 510 erroneously identifies real data as synthetic data, discriminator 510 may assign a high loss to itself. Conversely, when discriminator 510 correctly classifies the input as synthetic or real data respectively, discriminator 510 may produce a low loss to itself. Similarly, when generator 505 produces a forged sensitive data which is erroneously distinguished by discriminator 510 as real data, discriminator 510 may assign a low loss to generator 505 (to reward generator 505's successful fooling of discriminator 510). Vice versa, when discriminator 510 successfully classifies the data from generator 505 as synthetic, discriminator 510 may feedback a high loss to generator 505 (to punish generator 505's defeat). Based on respective losses, generator 505 and discriminator 510 may update their respective parameters (e.g., weights and biases), for instance, with backpropagation and descent gradients. For example, (a new value of weight) = (an old value of the weight) - (learning rate) × (partial gradient of the loss with respect to the weight). As generator 505 and PII discriminator 510 compete against each other in training, generator 505 may become more skilled at forging synthetic sensitive data, while discriminator 510 grow better at discriminating synthetic vs real sensitive data. Training of GAN 500 may require positive only examples (e.g., a list of clients' IDs) without having to annotate the corresponding objects and mark positions for the clients' IDs. This can ease collections of training sets and improve efficiencies of sensitive data detection.

Once trained, GAN 500 may be deployed in field operations to perform named entity type identification, as shown in FIG. 5B. For instance, discriminator 510 may receive record samples, for instance, from record sampling module 155 as described above in FIG. 1. discriminator 510 may identify whether the record samples contain the named entity types. By comparison, generator 505 may be deployed to produce synthetic or anonymous sensitive data. When there is a need to disclose sensitive data or part of the sensitive data, for instance, to a third party, the anonymous sensitive data may replace the entire or part of the data to satisfy the disclosure but without exposing the actual sensitive data.

Figure 6:
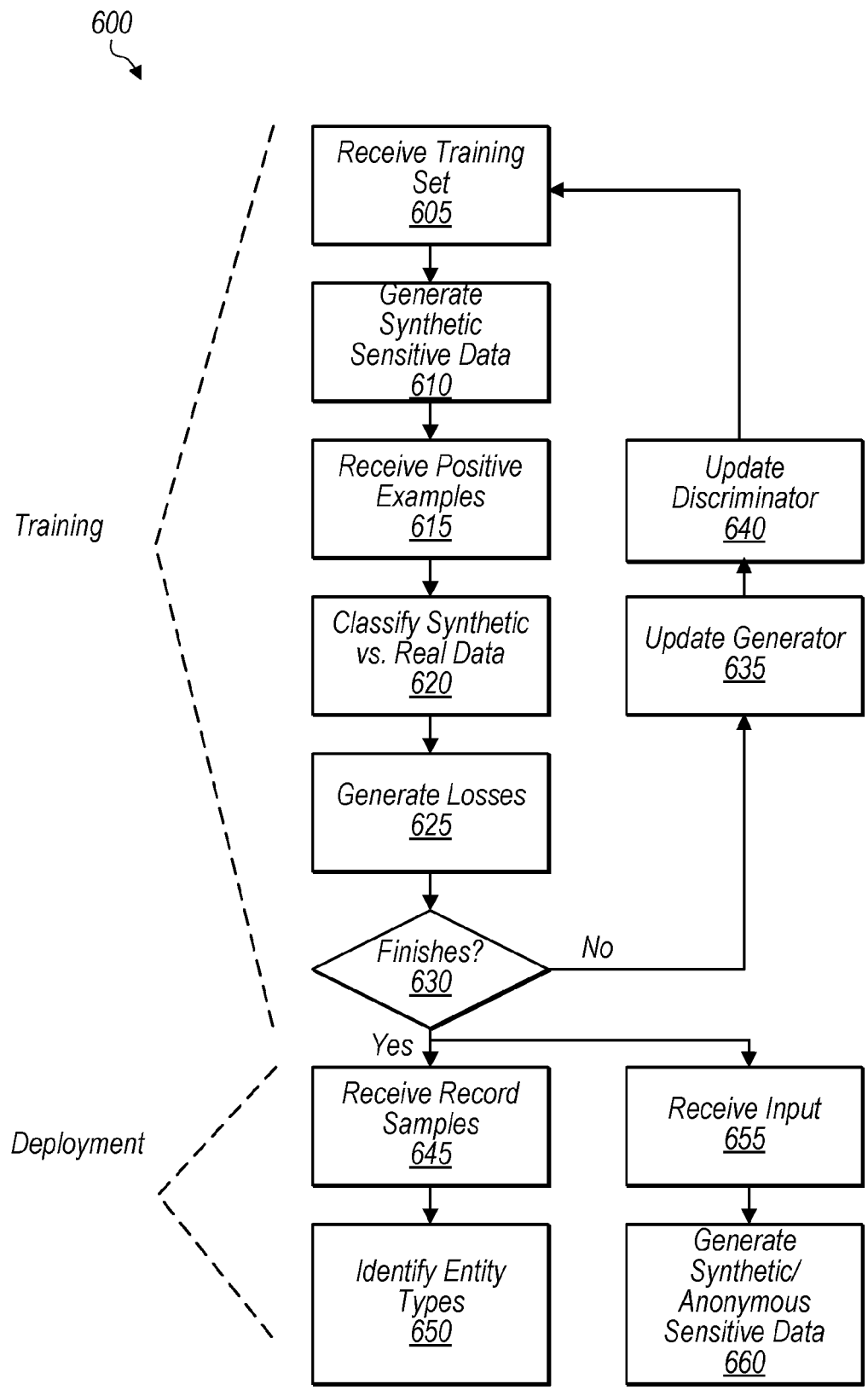
FIG. 6 is a flowchart showing an example process for using GAN to identify named entity types, according to some embodiments.

FIG. 6 shows example operations of GAN 500, according to some embodiments. As shown in FIG. 6, operation 600 may begin with training of GAN 500, as described above with regards to FIG. 5 (block 605). For instance, generator 505 may receive a training set (block 605) and generate synthetic sensitive data (block 610). discriminator 510 may receive positive examples (e.g., real data known to contain sensitive data) (block 615) and discriminate synthetic vs real sensitive data (block 620). discriminator 510 may generate losses for discriminator 510 itself and generator 505 (block 625). operation 600 may determine whether training of GAN 500 may complete (block 630). The determination may be reached based on, for example, how long GAN 500 has been trained, how many epochs have been executed, whether the losses fall within threshold values, etc. generator 505 and discriminator 510 may update their respective parameters, for instance, with backpropagation based on descent gradients, and repeat the above operations when the training is determined to continue (blocks 635 and 640). Conversely, when operation 600 determines that GAN 500's training finishes, GAN 500 may be deployed to identify named entity types in record samples (blocks 645 and 650). Separately, generator 505 may receive input such as random seeds (block 655) and generate synthetic or anonymous sensitive data (block 660).

According to some embodiments, generator 505 may be implemented with a long short-term memory (LSTM) network. LSTM is one type of recurrent neural network (RNN). A traditional artificial neural network (ANN) with standard feedforward and backpropagation updates parameters, such as weights and biases, every epoch with new input. However, this does not perfectly mimic a human being's language learning process because he/she may understand semantics of a word based on the word itself as well as its prior words (or prior context). Unlike traditional ANNs, a LSTM network may capture temporal context information by passing a hidden state from one memory cell to another. The LSTM network may also include input gate, output gate and/or forget gate to further control what new information may be acquired, what candidate may be passed onto output, and/or what old information may be remembered or forgot.

Figure 7:
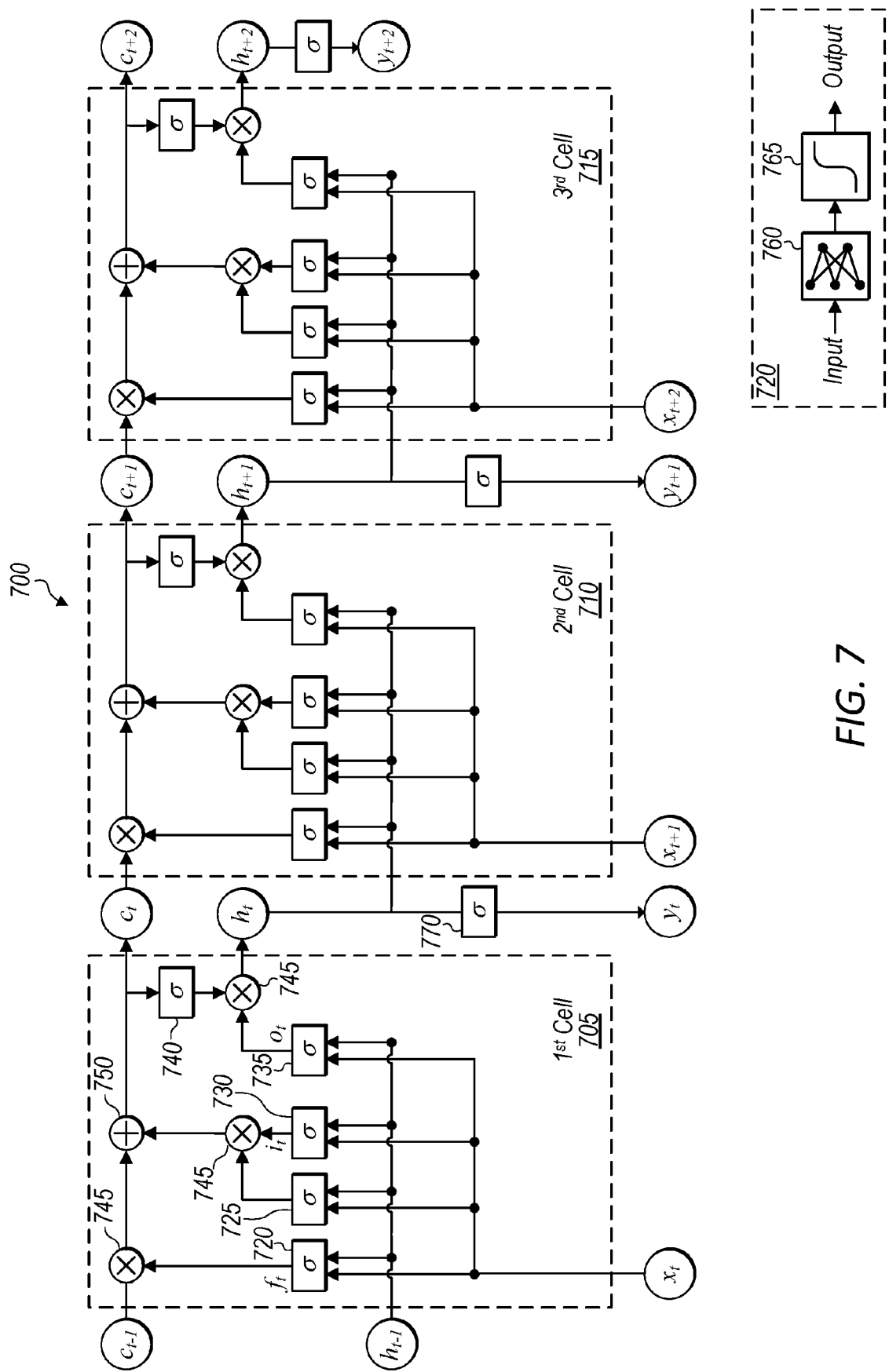
FIG. 7 is a block diagram showing structures of an example GAN generator, according to some embodiments.

FIG. 7 shows an example LSTM network used to implement generator 505, according to some embodiments. As shown in FIG. 7, LSTM network 700 may include first memory cell 705, second memory layer 710, and third memory layer 715. In some embodiments, cells 705, 710 and 715 may have substantially similar structures. In FIG. 7, x may represent an input vector. In the context of named entity recognition, x may represent a sequence of characters from record samples. According to some embodiments, the sequence of characters may first be transformed into machine-readable vectors of a uniform format, such as word embeddings of the characters, according to Word2Vec or GloVe. For example, if a record sample is a sequence of characters corresponding to a person's name, such as "John Alice Adams", x may be {[0.4, 23.4, -0.6], [9.7, 5.4, -1.2], [-0.7, -5.2, -0.9]}. LSTM network 700 may process characters in the sequence of characters x, one by one. For instance, LSTM network 700 may take [0.4, 23.4, -0.6] as $x_t$ and send it to $1^{st}$ cell 705 to generate output $y_t$; take [9.7, 5.4, -1.2] as $x_{t+1}$ to $2^{nd}$ cell 710 to generate output $y_{t+1}$; and take [-0.7, -5.2, -0.9] as $x_{t+1}$ to $3^{rd}$ cell 715 to generate output $y_{t+2}$. h may represent hidden states of cells 705, 710 and 715, and c may represent memory states of cells 705, 710 and 715. As shown in FIG. 7, each cell may take hidden states h and memory states c from a previous cell as part of input to produce its own hidden state and memory state. In FIG. 7, hidden states h and memory states c of cells 705, 710 and 715 may be configured with initial values, such as random values, at the beginning of the training of LSTEM network 700. In training, hidden states h and memory states c may be updated, for instance, according to equations (1) - (5) as described below. By passing characters to cells 705, 710 and 715 sequence-to-sequence, connections between cells 705, 710 and 715 may form a directional temporal loop. The hidden states h may carry information about what LSTM 700 has seen over the time and supply it to the present time such that a loss function is not just dependent upon the data it is seeing in this time instant, but also, what it has seen historically. For instance, $2^{nd}$ cell 710 may produce output $y_{t+1}$ based on information of a current character $x_{t+1}$ as well as a previous character $x_t$ (passed by $h_t$), and similarly $3^{rd}$ cell 715 may produce output $y_{t+2}$ based on a current character $x_{t+2}$ but also a previous character $x_{t+1}$ (through $h_{t+1}$). In other words, LSTM network 700 learns semantics from each work and prior context. Memory state may represent selective memory of the past and current instants. In particular, a cell may use respective input gate, forget gate and output gate to control what new information to acquire, what old information to remember and what candidate to pass onto output. For instance, $1^{st}$ cell 705 may comprise pointwise multiplication operators 745 associated with i, f and o, respectively. Each multiplication operator 745 may form a gate which may control passing of information. For instance, multiplication operator 745 associated with $f_t$ may multiple vectors $c_{t-1}$ and $f_t$ element-by-element. Assuming that $c_{t-1}$ equals to [0.3, 0.7] and $f_t$ equals to [1, 0], the pointwise multiplication of $c_{t-1}$ and $f_t$ produces [0.3, 0]. Thus, pointwise multiplication operator 745 passes the first element of $c_{t-1}$ (i.e., 0.3) and blocks the second element (i.e., 0.7). In other words, $f_t$ may represent a gate weight vector. Accordingly, i and o may each represent a gate weight vector for respective multiplication operators 745.

$1^{st}$ cell 705 may also include pointwise addition operator 750 which may add input vectors element-by-element to produce a sum. Moreover, activation operators 720, 725, 730, 735, 740 and 770 may each represent operations of an internally-connected network as shown at the lower corner of FIG. 7. For instance, activation operator 720 may include internally-connected network 760 and logistic sigmoid function 765. Given input, activation operator 720 may produce: output = sigmoid (weights° input + biases) where symbol "°" represents a pointwise multiplication and sigmoid() indicates a sigmoid function. Note that the activation operators in cells 705, 710 and 715 may employ different numbers of neurons, albeit they may have similar structures. In light of the above description and FIG. 7, operations of $1^{st}$ cell 705, may be described according to equations (1) - (6):

$$f_t = \sigma_f \left( W_{fx} x_t + W_{fh} h_{t-1} + b_f \right) \quad (1)$$

$$i_t = \sigma_i \left( W_{ix} x_t + W_{ih} h_{t-1} + b_i \right) \quad (2)$$

$$o_t = \sigma_o \left( W_{ox} x_t + W_{oh} h_{t-1} + b_o \right) \quad (3)$$

$$c_t = f_t \circ c_{t-1} + i_t \circ \sigma_c \left( W_{cx} x_t + W_{ch} h_{t-1} + b_c \right) \quad (4)$$

$$h_t = o_t \circ \sigma_h(c_t) = y_t \quad (5)$$

$$y_t = \sigma_y(W_{yh}h_t + b_y) \quad (6)$$

where:
- $x_t$: input vector;
- y: output vector;
- $h_t$: hidden state vector;
- $c_t$: memory state vector;
- $W_{fx}$, $W_{fh}$, $W_{ix}$, $W_{ih}$, $W_{ox}$, $W_{ho}$, $W_{cx}$, $W_{ch}$ and $W_{yh}$: weight matrices of activation operators 725-745 and 770;
- $b_f$, $b_i$, $b_o$, $b_c$ and $b_y$: bias vectors of activation operators 720-740 and 770;
- $f_t$, $i_t$ and $o_t$: forget gate weight vector, input gate weight vector, and output gate weight vector; and
- $\sigma_f$, $\sigma_i$, $\sigma_o$, $\sigma_c$, $\sigma_h$ and $\sigma_y$: logistic sigmoid functions of activation operators 720-740 and 770, e.g., sigmoid or hyperbolic tangent functions.

Referring back to FIG. 5, in training, LSTM network 700 (as used to implement generator 505) may generate synthetic sensitive data based on training set, for instance, random seeds. For instance, LSTM 700 may produce output y ({$y_t$, $y_{t+1}$, $y_{t+2}$}) which correspond to words "Michael", "Apple", and "Blue" according to equations (1) - (5). LSTM network 700 may provider as synthetic sensitive data to discriminator 510. discriminator 510 may take the synthetic sensitive data (with positive examples) as input and classify whether the synthetic sensitive data are real sensitive data, such as an employee's name, and accordingly assign a loss to LSTM network 700. In this example, discriminator 510 may classify that the synthetic sensitive data "Michael Apple Blue" is not a real name and thus assign a high loss to LSTM network 700. Based on the assigned loss, LSTM network 700 may update weights W and/or biases b, for instance, with backpropagation based on decent gradients. For instance, (a new value of weight) = (an old value of the weight) - (learning rate) × (partial gradient of loss with respect to the weight).

Figure 8:
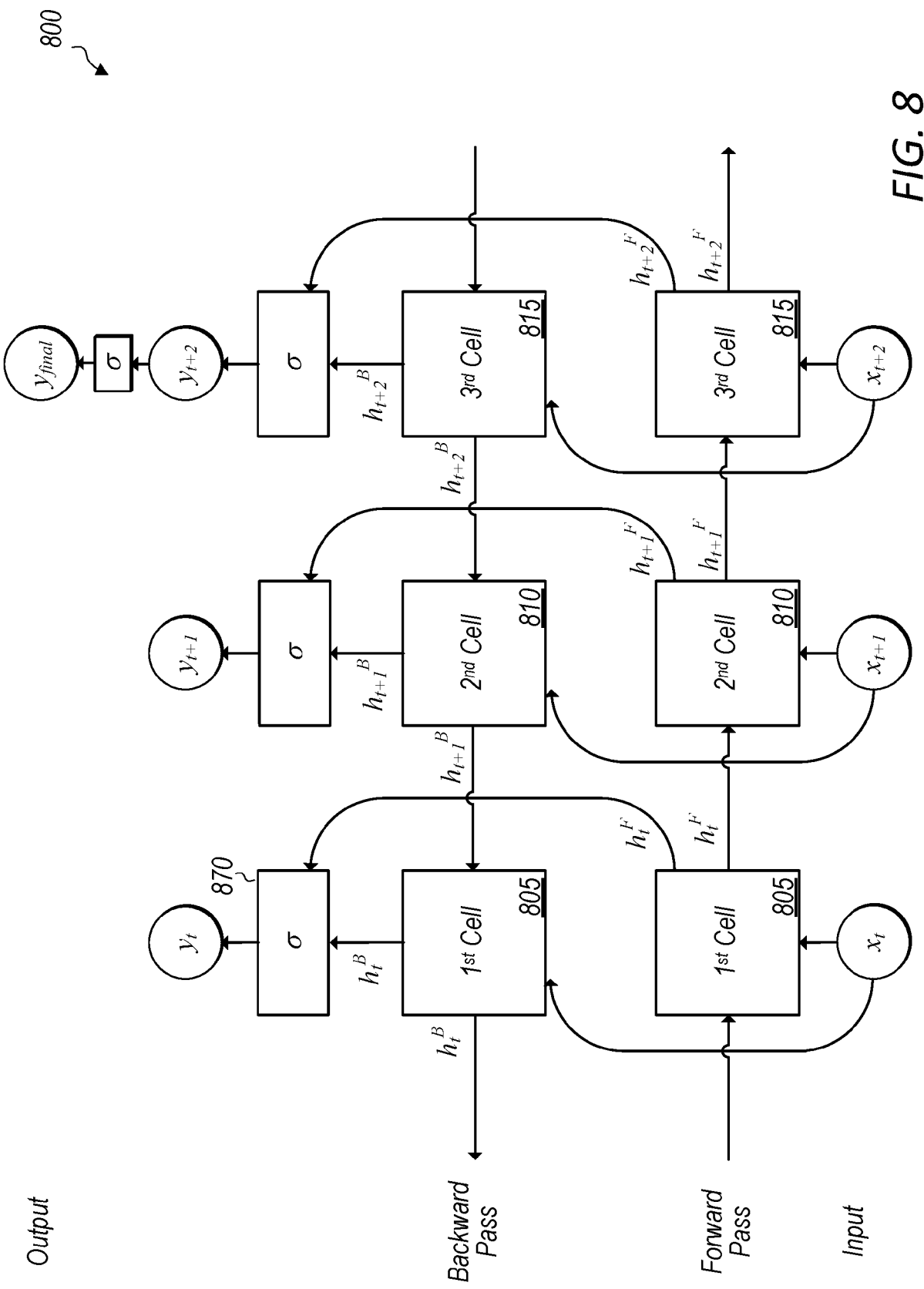
FIG. 8 is a block diagram showing structures of an example GAN discriminator, according to some embodiments.

FIG. 8 shows an example bidirectional LSTM network used to implement discriminator 510, according to some embodiments. Unlike a unidirectional LSTM network, a bidirectional LSTM network may learn semantics not only from prior context but also posterior context. As shown in FIG. 8, bidirectional LSTM network 800 may include 1st cell 805, 2nd cell 810 and 3rd cell 815. Cells 805, 810 and 815 may be implemented substantially similar to cells 705, 710 and 715 of FIG. 7. Operations of bidirectional LSTM network 800 may include a forward pass and a backward pass. The forward pass may be substantially similar to operations of LSTM network 700, as described above with regards to FIG. 7. For instance, 1st cell 805 may calculate hidden state $h_t^F$ and memory state $c_t^F$ based on $x_t$, $h_{t-1}^F$ and $c_{t-1}^F$, and pass $h_t^F$ and $c_t^F$ to 2nd cell 810; 2nd cell 810 may then take $h_t^F$, $c_t^F$ and $x_{t+1}$ as input to calculate hidden state $h_{t+1}^F$ and memory state $c_{t+1}^F$, and pass $h_{t+1}^F$ and $c_{t+1}^F$ to 3rd cell 815; and 3rd cell 815 may next calculate hidden state $h_{t+2}^F$ and memory state $c_{t+2}^F$ based on $x_{t+2}$, $h_{t+1}^F$ and $c_{t+1}^F$, for instance, according to equations (1) - (5). As described above, this forward pass may allow bidirectional LSTM network 800 to learn semantics from prior context by passing hidden states $h^F$ from 1st cell 805 → 2nd cell 810 → 3rd cell 815. Besides the forward pass, LSTM network 800 may also include a backward pass, as shown in FIG. 8. The backward pass may be viewed as a copy of the forward pass but in a reverse sequence. For instance, 3rd cell 815 may calculate hidden state $h_{t+2}^B$ and memory state $c_{t+2}^B$ based on $x_{t+2}$, $h_{t+3}^B$ and $c_{t+3}^B$, and pass $h_{t+2}^B$ and $c_{t+2}^B$ to 2nd cell 810; 2nd cell 810 may then take $h_{t+2}^B$, $c_{t+2}^B$ and $x_{t+1}$ as input to calculate hidden state $h_{t+1}^B$ and memory state $c_{t+1}^B$, and pass $h_{t+1}^B$ and $c_{t+1}^B$ to 1st cell 805; and 1st cell 805 may next calculate hidden state $h_t^B$ and memory state $c_t^B$ based on $x_t$, $h_{t+1}^B$ and $c_{t+1}^B$. Because hidden states $h^B$ are passed in the reverse sequence from 3rd cell 815 → 2nd cell 810 → 1st cell 805, the backward pass of bidirectional LSTM network 800 may allow bidirectional LSTM network 800 to learn semantics from posterior context, as well. In short, bidirectional LSTM network 800 may learn words from what it sees at the present instant, prior history and posterior context. Once hidden states h are calculated in both directions, the two sequences of hidden states $h^F$ and $h^B$ may then be used together to produce output of the bidirectional LSTM network.

According to some embodiments, bidirectional LSTM network 800 may also include a convolutional operation and a highway gated operation on top of the above described LSTM operations in forward and backward passes. For instance, for each element of the sequence of input x, e.g., $x_i$, its embedding $e(x_i)$ may be concatenated with the left context $cxt_l(x_i)$ and right context $cxt_r(x_i)$ to form a context-dependent representation $\tilde{x}_i = [cxt_l(x_i), e(x_i), cxt_r(x_i)]$. The left context $cxt_l(x_i)$ may be a vector which is recursively computed by adding (1) the previous left context $cxt_l(x_{i-1})$ multiplied by a weight matrix $W_l$ and (2) the embedding of the current left element $e(x_{i-1})$ multiplied by a left "semantic" weight matrix $W_{sl}$, for instance, according to equation (7). Similarly, the right context $cxt_r(x_i)$ may be a vector which is recursively computed by adding (1) the previous right context $cxt_r(x_{i+1})$ multiplied by a weight matrix $W_r$ and (2) the embedding of the current right element $e(x_{i+1})$ multiplied by a right "semantic" weight matrix $W_{sr}$, for instance, according to equation (8).

$$cxt_l(x_i) = \sigma(W_l cxt_l(x_{i-1}) + W_{sl}e(x_{i-1})) \quad (7)$$

$$cxt_r(x_i) = \sigma(W_r cxt_r(x_{i+1}) + W_{sr}e(x_{i+1})) \quad (8)$$

The context-dependent representation $\tilde{x}$ may be reduced to a lower dimensional space and max-pooled to produce semantic word-context features, for instance, according to equations (9) - (11). The extracted features $x_i^2$ may be provided to bidirectional LSTM 800 to replace original input x to generate output y.

$$\tilde{x}_i = [cxt_l(x_i), e(x_i), cxt_r(x_i)] \quad (9)$$

$$x_i^1 = tanh(W^1\tilde{x}_i + b^1) \quad (10)$$

$$x^2 = maxpool(x_i^1), i = 1..n \quad (11)$$

where:
- tanh(): hyperbolic tangent function;
- maxpool (): Maxpooling function;
- $W^1$: a diagonal weight matrix;
- $b^1$: a bias vector; and
- n: the number of words in the sequence of input characters x, e.g., n = 3.

Bidirectional LSTM network 800 may also use a highway-gated operation to achieve faster and better convergence of LSTM. For instance, bidirectional LSTM network 800 may use a transform gate T to calculate output y according to equations (12) - (13):

$$T = \sigma(W_T x^2 + b_T) \quad (12)$$

$$y = TH(x^2, W_H) + (1-T)x^2 \quad (13)$$

where:
T: transform gate. When T = 1, y = H($x^2$, $W_H$); when T = 0, y = $x^2$ meaning that input $x^2$ is passed directly to y as an information "highway";
H: affine transform of bidirectional LSTM with memory cells described in equations (1) - (6);
$W_T$: a diagonal weight matrix;
$b_T$: a bias vector; and
σ. a logistic sigmoid function, e.g., a sigmoid or hyperbolic tangent function.

A final output layer may provide a classification probability as a loss. Referring back to FIG. 5, bidirectional LSTM network 800 (as used to implement discriminator 510) may use a cross-entropy as the loss function, for instance, according to equations (14) - (15). Bidirectional LSTM network 800 may update its parameters, such as weights and biases, with backpropagation based on descent gradients of the cross-entropy loss function.

$$y_{final} = \sigma(W_o y + b_o) \quad (14)$$

$$L(y_{final}, \hat{y}_{final}) = -\hat{y}_{final} \log y_{final} - (1 - \hat{y}_{final}) \log(1 - y_{final}) \quad (15)$$

where:
$W_o$: a diagonal weight matrix;
$b_o$: a bias vector;
σ. a logistic sigmoid function, e.g., a sigmoid or hyperbolic tangent function;
$\hat{y}_{final}$: a wrongly assumed probability corresponding to $y_{final}$;
L ($y_{final}$, $\hat{y}_{final}$): a cross-entropy; and
logo: a logarithm function.

Figure 9:
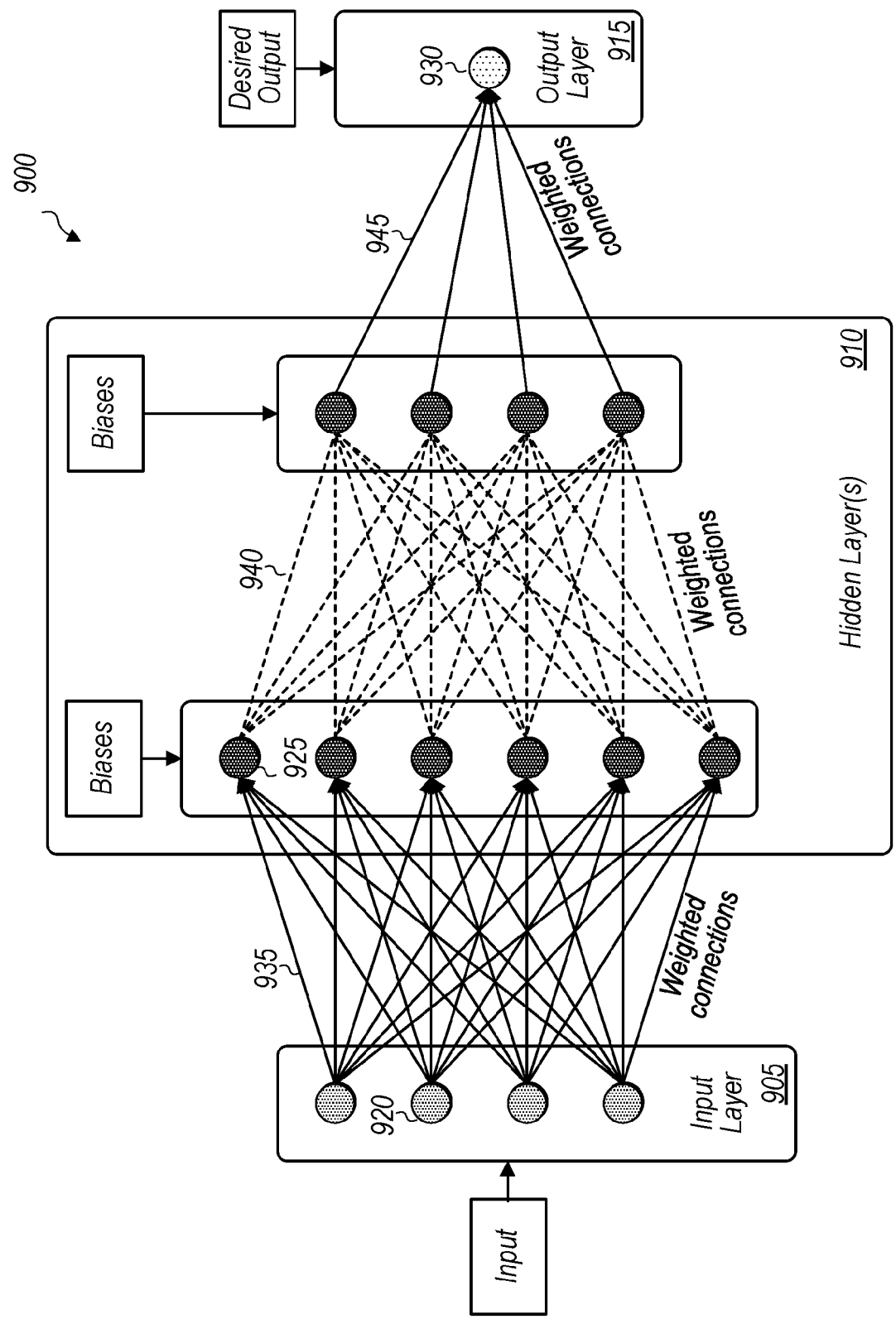
FIG. 9 is a block diagram showing structures of an example sensitive data store classifier, according to some embodiments.

According to some embodiments, sensitive data detection system 145 may implement data store classifier 175 with a supervised artificial neural network (ANN), as shown in FIG. 9. As shown in FIG. 9, ANN 900 (as used to implement data store classifier 175) may include input layer 905, hidden layer(s) 910 and output layer 915. Layers 905, 910 and 915 may each comprise one or more neurons 920, 925 and 930. neurons 920 of input layer 905 may receive input, such as data simulating extracted features provided by feature engineering module 170. neurons 920 of input layer 905 may provide the input to neurons of hidden layer(s) 910 through connections 935. Each connection 935 may be associated with a weight. neurons 925 of hidden layer 910 may calculate an intermediate output based on respective activation functions. For instance, if 1$^{st}$ neuron 925 of 1$^{st}$ hidden layer 910 receives input x having four elements, [$x_1, x_2, x_3, x_4$], from neurons 920 of input layer 905. 1$^{st}$ neuron 925 may produce an intermediate output $z_1$ based on the activation function of 1$^{st}$ neuron 925. For instance, $z_1$ = tanh ($w_{11} \times x_1 + w_{12} \times x_2 + w_{13} \times x_3 + w_{14} \times x_4 + b_1$), where $w_{11}$, $w_{12}$, $w_{13}$, and $w_{14}$ each correspond to a weight associated with one connection 935 between one neuron 920 of input layer 905 and 1$^{st}$ neuron 925 of 1$^{st}$ hidden layer 910, $b_1$ represents a bias to 1$^{st}$ neuron 925 of 1$^{st}$ neuron 910, and tanh() refers to a hyperbolic tangent function. This activation operation may repeat on each neuron 925 of 1$^{st}$ hidden layer 910 with respective weights and biases. The set of intermediate output $z_1$ may then be passed from 1$^{st}$ hidden layer 910 to a next hidden layer 910 through inter-hidden-layer connections 940 and taken as input by neurons of the next hidden layer 910 to calculate a next set of intermediate output $z_2$. The operations may repeat until the last hidden layer 910 may pass the last set of intermediate output $z_n$ to output layer 915 (through connections 945) which may then calculate output y. For purposes of illustration, output layer 915 may include one single neuron 930 because data store classifier 175 may provide only one single value - a confidence score indicating a probability for the data store to be classified as a sensitive data store. In training, input layer 905 may take a training set to calculate y. Output layer 915 may receive a desired output associated with the training set to calculate a loss. For instance, when y matches the desired output, output layer 915 may assign a low loss; while when y does not match the desired output, output layer 915 may assign a high loss. ANN 900 may then update parameters, for instance, weights and/or biases associated with the above connections and activation functions, based on the loss and descent gradients. Once trained, ANN 900 may be deployed to classify a data store, for instance, based on extracted features provided by feature engineering module 170 of FIG. 1. The extracted feature may comprise information representing identification of named entity types as well as associated context. For example, the extracted features may include a percentage of records from a record set or cluster which have a given entity type, a mean number of labels of a given type from a given field of records in a record set or cluster, approximation of heat maps used to statistically test if a given sample comes from a given distribution characterizing a named entity, etc. Based on the extracted features, ANN 900 (as used to implement data store classifier 175) may detect whether a data store contains sensitive data with an assigned confidence score.

Figure 10:
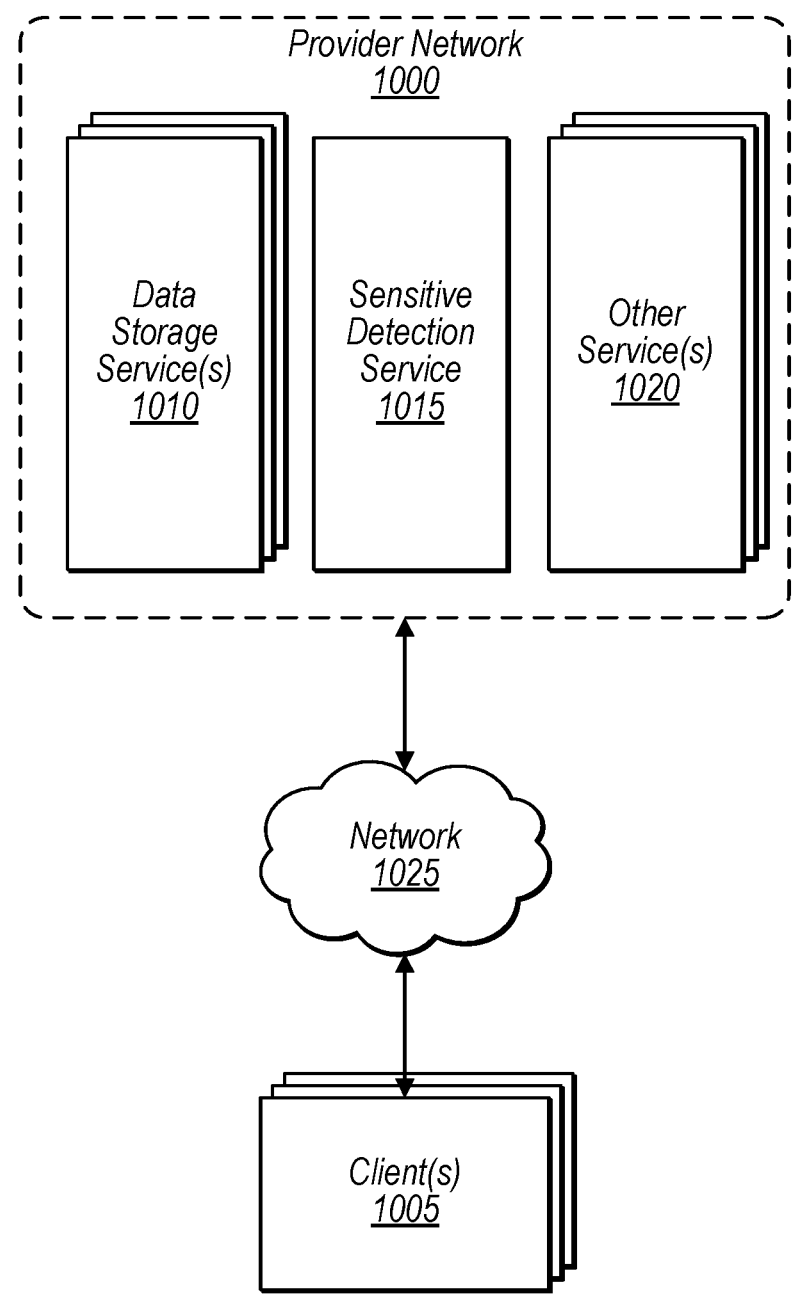
FIG. 10 is a block diagram showing providing sensitive data detection as a provider network service, according to some embodiments.
Figure 11:
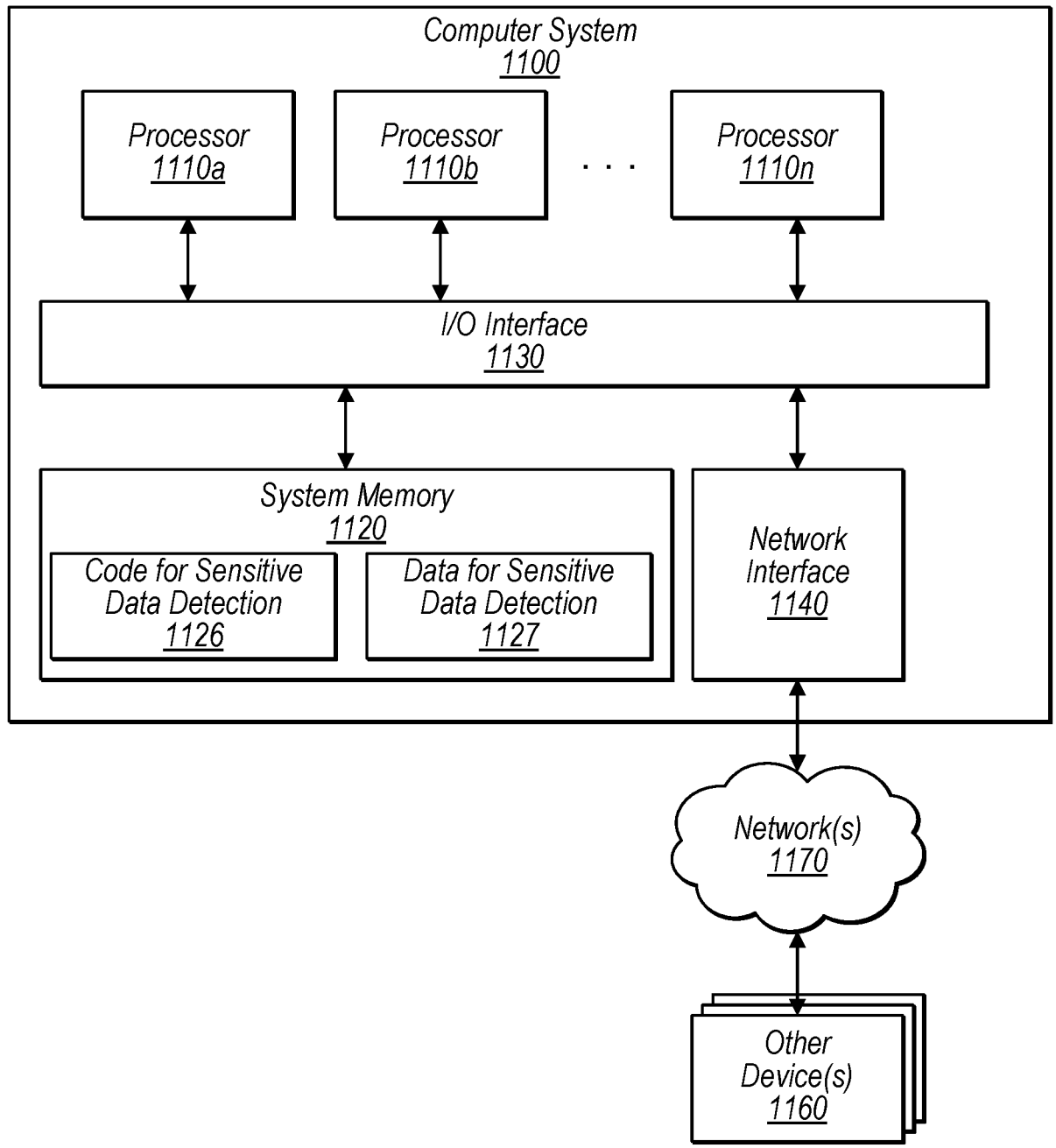
FIG. 11 is a block diagram showing an example computing system configured to implement the various systems, methods and techniques described herein, according to some embodiments.

FIG. 10 is a block diagram showing providing sensitive data detection as a provider network service, according to some embodiments. In FIG. 10, provider network 1000 may be a private or closed system or may be set up by an entity such as a company or a public sector organization to provide one or more services (such as various types of cloud-based storage) accessible via the Internet and/or other networks to one or more client(s) 1000. Provider network 1000 may be implemented in a single location or may include numerous data centers hosting various resource pools, such as collections of physical and/or virtualized computer servers, storage devices, networking equipment and the like (e.g., computing system 1100 described below with regard to FIG. 11), needed to implement and distribute the infrastructure and storage services offered by provider network 1000. In some embodiments, provider network 1000 may implement various computing resources or services, such as a data storage service(s) 1010 (e.g., object storage services, block-based storage services, or data warehouse storage services), sensitive data detection service 1015, as well as other service(s) 1020, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 1010 may implement different types of data stores for storing, accessing, and managing data on behalf of client(s) 1005 as a network-based service that enables one or more client(s) 1005 to operate a data storage system in a cloud or network computing environment. For example, data storage service(s) 1010 may include various types of database storage services (both relational and non-relational) or data warehouses for storing, querying, and updating data. Such services may be enterprise-class database systems that are scalable and extensible. Queries may be directed to a database or data warehouse in data storage service(s) 1010 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 1010 may also include various kinds of object or file data stores for putting, updating, and getting data objects or files, which may include data files of unknown file type. Such data storage service(s) 1010 may be accessed via programmatic interfaces (e.g., APIs) or graphical user interfaces. Data storage service(s) 1010 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, sensitive data detection service 1015 may inspect datasets per requests of client(s) 1005. For instance, client(s) 1005 may send a request to provider network 1000 for sensitive data detection service 1015 of a dataset uploaded by client(s) 1005. client(s) 1005 may upload the dataset to provider network 1000 which may store the dataset on one or more storage resources using data storage service(s) 1010. Sensitive data detection service 1015 may launch appropriate computing resources to load a sensitive data detection system from a model repository (to create an instance of the corresponding model), as described above with regards to FIG. 4. The sensitive data detection system may access and inspect the client's uploaded dataset for sensitive data. The sensitive data detection may be performed following the processes described above in FIGS. 1-9. Based on the detection, the sensitive data detection system may publish a sensitive data summary and optional recommendations of privacy policy to client(s) 1005. After the dataset inspection is finished, sensitive data detection service 1015 may terminate the PII data detection system and release associated computing resources.

Other service(s) 1020 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 1010. Various other distributed processing architectures and techniques may be implemented by data processing services (e.g., grid computing, sharding, distributed hashing, etc.). Note that in some embodiments, data processing operations may be implemented as part of data storage service(s) 1010 (e.g., query engines processing requests for specified data).

Generally speaking, client(s) 1005 may encompass any type of client configurable to submit network-based requests to provider network 1000 via network 1025, including requests for storage services (e.g., a request to create, read, write, obtain, or modify data in data storage service(s) 1010, a request to perform on-demand PII detection at PII data detection service(s) 1015, etc.). For example, a given client 1005 may include a suitable version of a web browser, or may include a plug-in module or other type of code module configured to execute as an extension to or within an execution environment provided by a web browser. Alternatively, a client 1005 may encompass an application such as a database application (or user interface thereof), a media application, an office application or any other application that may make use of storage resources in data storage service(s) 1010 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 1005 may be an application configured to interact directly with provider network 1000. In some embodiments, client(s) 1005 may be configured to generate network-based services requests according to a Representational State Transfer (REST)-style network-based services architecture, a document- or message-based network-based services architecture, or another suitable network-based services architecture.

In various embodiments, network 1025 may encompass any suitable combination of networking hardware and protocols necessary to establish network-based-based communications between client(s) 1005 and provider network 1000. For example, network 1025 may generally encompass the various telecommunications networks and service providers that collectively implement the Internet. Network 1025 may also include private networks such as local area networks (LANs) or wide area networks (WANs) as well as public or private wireless networks. For example, both a given client 1005 and provider network 1000 may be respectively provisioned within enterprises having their own internal networks. In such an embodiment, network 1025 may include the hardware (e.g., modems, routers, switches, load balancers, proxy servers, etc.) and software (e.g., protocol stacks, accounting software, firewall/security software, etc.) necessary to establish a networking link between given client 1005 and the Internet as well as between the Internet and provider network 1000. It is noted that in some embodiments, client(s) 1005 may communicate with provider network 1000 using a private network rather than the public Internet.

Sensitive data detection system 145, including topology inference module 150, record sampling module 155, entity type identifier 160, structural clustering module 165, feature engineering module 170 and data store classifier 175 described herein, may in various embodiments be implemented by any combination of hardware and software. For example, in one embodiment, sensitive data detection system 145 may be implemented by a computer system, for instance, a computer system as in FIG. 11 that includes one or more processors executing program instructions stored on a computer-readable storage medium coupled to the processors. In the illustrated embodiment, computer system 1100 includes one or more processors 1110 coupled to a system memory 1120 via an input/output (I/O) interface 1130. Computer system 1100 further includes a network interface 1140 coupled to I/O interface 1170. While FIG.

11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1605 may be general-purpose or embedded processors implementing any of a variety of instruction set architectures (ISAs), such as the x86, PowerPC, SPARC, or MIPS ISAs, or any other suitable ISA. In multiprocessor systems, each of processors 1605 may commonly, but not necessarily, implement the same ISA.

System memory 1120 may be one embodiment of a computer-accessible medium configured to store instructions and data accessible by processor(s) 1110. In various embodiments, system memory 1120 may be implemented using any non-transitory storage media or memory media, such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140. In the illustrated embodiment, program instructions (e.g., code) and data implementing one or more desired functions, such as sensitive data detection described above in FIGS. 1 - 10, are shown stored within system memory 1130 as code 1126 and data 1127.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1170, such as data store catalog 305, sensitive data definitions registry 315, privacy compliance rules registry 320, and/or other computer systems or devices as illustrated in FIGS. 3-4, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fiber Channel SANs, or via any other suitable type of network and/or protocol.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:
1. A system, comprising:
 a generator of a generative adversarial network (GAN) implemented by one or more processors and memory and configured to:
  be trained to generate one or more synthetic data based on training sets to the generator, the one or more synthetic data including information that simulates sensitive information; and
 a discriminator of the GAN implemented by the one or more processors and memory and configured to:
  be trained to classify each one of training sets to the discriminator that include the one or more synthetic data generated by the generator and one or more positive examples as synthetic data or a positive example, the one or more positive examples each including the sensitive information; and
  be deployed to identify that a data store includes at least some data matching a named entity type based on samples of data of the data store, wherein the samples are sampled according to a distribution of the data within the data store, the named entity type representing the sensitive information.
2. The system of claim 1, wherein the generator is further configured to:
 be deployed to generate anonymous data to replace data that include one or more sensitive information.
3. The system of claim 1, wherein the discriminator is implemented based on a bidirectional long short-term memory (LSTM) network.
4. The system of claim 1, wherein the generator is implemented based on a unidirectional LSTM network.
5. The system of claim 1, wherein the generator and the discriminator are implemented as part of a data store classification service offered by a provider network, and wherein data of the data store is received via a network-based interface for the data store classification service and stored in the data store that is implemented as part of a data storage service offered by the provider network.
6. A method, comprising:
 performing, by one or more computers:
  training a generator, implemented by one or more processors and memory, to generate one or more synthetic data based on training sets to the generator, the one or more synthetic data including information that simulates sensitive information;

training a discriminator, implemented by the one or more processors and memory, to classify each one of training sets to the discriminator that include the one or more synthetic data generated by the generator and one or more positive examples as synthetic data or a positive example, the one or more positive examples each including the sensitive information; and deploying the discriminator to identify that a data store includes at least some data matching a named entity type based on samples of data of the data store, wherein the samples are sampled according to a distribution of the data within the data store, the named entity type representing the sensitive information.

7. The method of claim 6, wherein said training the discriminator to classify each one of the training sets as synthetic data or a positive example comprises:

providing, by the discriminator, one or more losses, according to respective loss functions, to the discriminator and the generator based on the classification of the each one of the training sets to the discriminator.

8. The method of claim 7, wherein said providing the one or more losses comprises:

responsive to classifying a training set including a positive example as a positive example or classifying a training set including one synthetic data as synthetic data, providing a low loss to the discriminator; and responsive to classifying the training set including the positive example as synthetic data or classifying the training set including the one synthetic data as synthetic data, providing a high loss to the discriminator.

9. The method of claim 7, wherein said providing the one or more losses comprises:

responsive to classifying a training set including one synthetic data as a positive example, providing a low loss to the generator; and responsive to classifying the training set including the one synthetic data as synthetic data, providing a high loss to the generator.

10. The method of claim 6, further comprising:

deploying the generator to generate anonymous data to replace data that include one or more sensitive information.

11. The method of claim 6, wherein the discriminator is implemented based on a bidirectional LSTM network.

12. The method of claim 6, wherein the generator is implemented based on a unidirectional LSTM network.

13. The method of claim 6, wherein said training the generator and said training and deploying the discriminator are implemented by a data store classification service offered by a provider network, and wherein data of the data store is received via a network-based interface for the data store classification service and stored in the data store that is implemented as part of a data storage service offered by the provider network.

14. One or more non-transitory computer readable media comprising instructions which, when executed on or across one or more processors, cause the one or more processors to:

access, using a discriminator, data of a data store; and identify, using the discriminator, that the data store includes at least some data matching a named entity type that represents sensitive information according to a confidence value indicating a probability based on samples of data of the data store, wherein the samples of the data are sampled according to a distribution of the data within the data store, wherein the discriminator is trained to classify each one of training sets to the discriminator that include one or more synthetic data and one or more positive examples as synthetic data or a positive example, the one or more positive examples each including the sensitive information, and the one or more synthetic data including information that simulates the sensitive information and generated by a generator based on training sets to the generator.

15. The one or more non-transitory computer readable media of claim 14 comprising instructions which, when executed on or across the one or more processors, cause the one or more processors to:

responsive to classifying a training set including a positive example as a positive example or classifying a training set including one synthetic data as synthetic data, provide a low loss to the discriminator; and responsive to classifying the training set including the positive example as synthetic data or classifying the training set including the one synthetic data as a positive example, provide a high loss to the discriminator.

16. The one or more non-transitory computer readable media of claim 14 comprising instructions which, when executed on or across the one or more processors, cause the one or more processors to:

responsive to classifying a training set including one synthetic data as a positive example, provide a low loss to the generator; and responsive to classifying the training set including the one synthetic data as synthetic data, provide a high loss to the generator.

17. The one or more non-transitory computer readable media of claim 15 comprising instructions which, when executed on or across the one or more processors, cause the one or more processors to:

generate, using the generator, anonymous data to replace data that include one or more sensitive information.

18. The one or more non-transitory computer readable media of claim 14 comprising instructions which, when executed on or across the one or more processors, cause the one or more processors to implement the discriminator based on a bidirectional LSTM network.

19. The one or more non-transitory computer readable media of claim 14 comprising instructions which, when executed on or across the one or more processors, cause the one or more processors to implement the generator based on a unidirectional LSTM network.

20. The one or more non-transitory computer readable media of claim 14, wherein the generator and the discriminator are implemented as part of a data store classification service offered by a provider network, and wherein data of the data store is received via a network-based interface for the data store classification service and stored in the data store that is implemented as part of a data storage service offered by the provider network.

* * * * *